Figure 1:
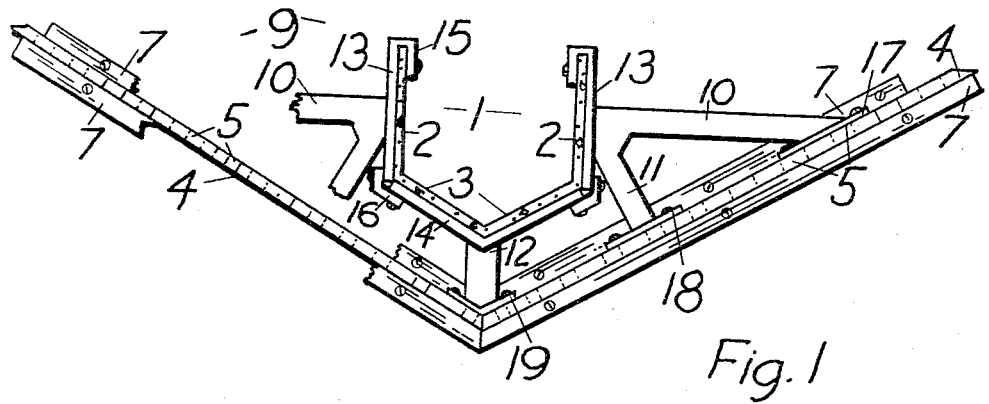

April 11, 1967 A. A. HIRSCH 3,313,420
PERFORATED EQUALIZATION BAFFLES FOR BACKWASHING
RAPID SAND FILTERS AND PARALLEL APPLICATIONS
Filed Oct. 7, 1963 3 Sheets-Sheet 1

INVENTOR.
A. Adler Hirsch

INVENTOR.
a. adler Hirsch

United States Patent Office 3,313,420
Patented Apr. 11, 1967

3,313,420
PERFORATED EQUALIZATION BAFFLES FOR BACKWASHING RAPID SAND FILTERS AND PARALLEL APPLICATIONS
A. Adler Hirsch, 141 Norwood St., Shreveport, La. 71105
Filed Oct. 7, 1963, Ser. No. 314,172
10 Claims. (Cl. 210—275)

This invention consists of an improvement in the back wash structure of a rapid sand filter such as widely used in water purification, although its principles may broadly be applied to any vessel containing a permeable septum, either of the particulate bed or porous membrane type through which liquid must be constrained to flow uniformly throughout the cross-section thereof before collection into a draw-off element.

For a volume of fluid to flow uniformly through the whole area of a substantially homogeneous septum two conditions must be met. First, the stream lines must be uniformly distributed within the liquid as it approaches the septum and, second, uniform distribution must be preserved as the liquid emerges, at least for a short distance beyond the septum. In brief, the stream lines through the medium must be parallel. Unless both criteria are satisfied flow through the system will vary from point to point, and, according to the apparatus involved, lead to inefficiency in performance and difficulty in maintenance.

As applied to rapid sand filters it is highly desirable to distribute the wash water evenly as it flows upwardly through the bed. Otherwise some of the sand is incompletely washed leading to elevated initial loss of head, early floc breakthrough, premature drop off in output and shortened filter runs functionally; and cracked beds, mud lumps, sand boils and mounded sand and gravel structurally. On the other hand, portions of the sand bed are consequently overwashed, causing a carryover of sand grains, unless the upflow rate is decreased. This in turn further reduces the flow in poorly washed zones.

Earnest efforts have been made to equalize the flow of wash water on the approach side of the filter bed. These have included well proportioned manifolding, liberal placement of laterals, special jet spacings, duplex type under drains, pyramidal flow deflectors, continuous type of false flooring, porous plate bottoms and other variations in detail. Experience has demonstrated, however, that filter bed troubles develop regardless of the type of underdrain installed or the rising velocity of the wash water. As a corrective attempt, surface washes, using air or high pressure water jets, on rotary distrbutors or stationary grids, have been used but these, while helpful to some extent, definitely have not eliminated filter troubles.

To indicate the extent of maldistribution of wash water throughout the water treatment industry, the writer has never in his experience yet observed a filter wash in which the upflow of wash water is uniform over the whole surface of the bed. Universality of this conditon will be realized by noting that filters invariably wash more poorly near the wall and in median areas between the troughs, and always, no exceptions, wash preferentially better at the rims of the troughs, as attested during a backwash by a lingering haze of turbidity in the first locations and an early clearing in the last. The poorly cleaned sections resulting from an uneven wash may even present a sanitary hazard as they may be the foci of undesirable organisms.

Since design of underdrains has not alleviated wash water channeling and the palliative of surface wash has not been a corrective consideration should be directed to the second requirement of parallelism in backwash stream lines. This essentially requires proper guidance of the emergent washings slightly above the expanded sand. With the exception of a single recent patent in which unperforated boards, sloping downwardly from the troughs in inverted V pattern are set to guide distal water to the lips, management of currents above the bed have been ignored.

The present application deals with the baffling of wash water upflow in the emergent zone above the expanded media in such a way that maximum resistance to flow is interposed in those areas adjacent to the trough rims, and reduced resistance, tapering to none in the mid line between troughs, is provided at a distance. In this way short circuiting preferentially under the lip of the trough is prevented. Basically, this short circuiting has been the insidious cause of the majority of filter bed troubles. Alignment of flow above the septum has been the missing factor in proper filter design.

The heavy concentration of wash water in past and contemporary construction into a truly narrow band can be realized from the short overflow height of the washings above the trough lips. If the area of this overflow stream were turned horizontally it would roughly indicate the intensely directed path of the washings. That a filter washes at all can be attributed only to the circumstance that the bed is free to move. In a fixed bed apparatus the septum soon would be permanently fouled.

In order to accomplish the objectives of this invention, applicant mounts perforated inclined V-shaped baffles in the supernatant of a filter, with the apex under the center line of the trough. Areas cut out by perforations in this flow-equalizing baffle are a minimum under the lip of the trough so as to retard the flow of water close by; these cut out areas vary to a maximum at the distal edges of the baffle so as to reduce the hydraulic resistance as origin of flow recedes from the trough. Unrestricted flow is allowed along the mid-band between the troughs in a relatively short width. This tapering resistance is provided as a first approximation by making the areas of the holes in the baffle directly proportional to the horizontal component of the distance from the sides of the trough. An excess of holes is initially punched out, so that adjustment may be made after installation by plugging up superfluous openings. The V-form is chosen for simplicity and rigidity. With provision for plugging excess holes any form of concave-upward trough, plane or curvilinear, may be made to function satisfactorily. Fundamentally, the broad objective of this device is to attain parallelism and equidistant spacing of flow lines in the ascending backwash stream throughout its traverse of the filter bed.

The specific objects of my invention then may be summarized as follows:

(1) To improve the hydraulics of backwashing;
(2) To cause even distribution of wash water as it flows vertically through a filter bed;
(3) To describe a structure to accomplish these objectives;
(4) To improve the performance and economy of filter operation by better backwash arrangement;
(5) To reduce the maintenance demands of a filter bed;
(6) To devise a light weight rigid structure for these purposes;
(7) To devise an installation that does not interfere with the production phase of a filter cycle;
(8) Most importantly, to describe an equalizing means for backwashing that is adjustable on a specific installation so as to achieve uniform distribution over the whole filter bed, and (9) To describe methods for testing and adjusting the performance of this back wash equalization structure in situ so as to obtain uniformity in upflow through the bed.

Still further objects and the entire scope of applicability of the present invention will become apparent from the detailed description given hereinafter. It should be understood, however, that the detailed description and specific example is given by way of illustration only, and, while indicating a preferred embodiment of the invention, is not given by way of limitation, since various changes and modifications within its spirit and scope will become apparent to skilled and informed practitioners.

For a more complete understanding of the nature and scope of this invention reference is made to the accompanying drawings showing details of my perforated V-shaped flow equalization baffles as applied to a rapid sand filter such as used in water treatment.

Figure 2:
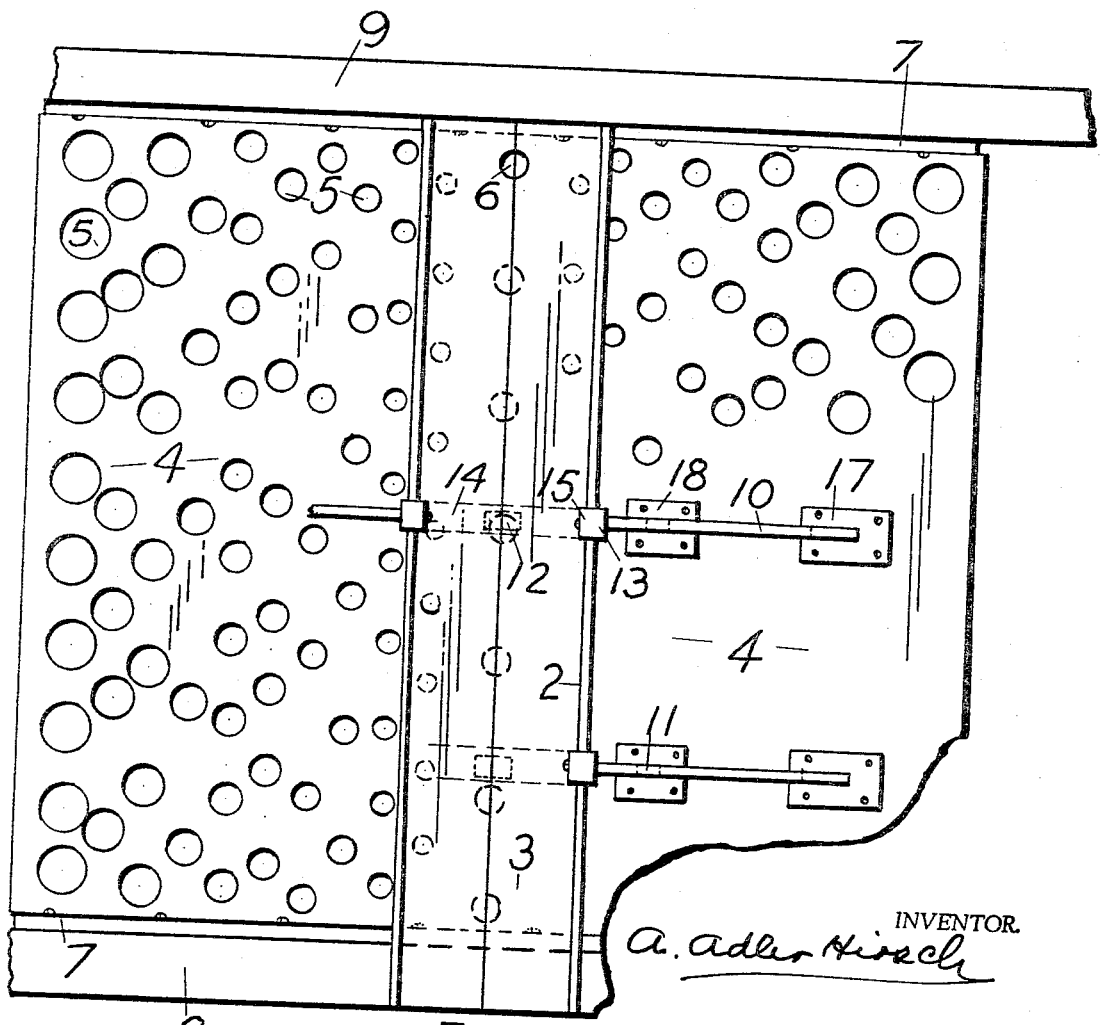
Figure 3:
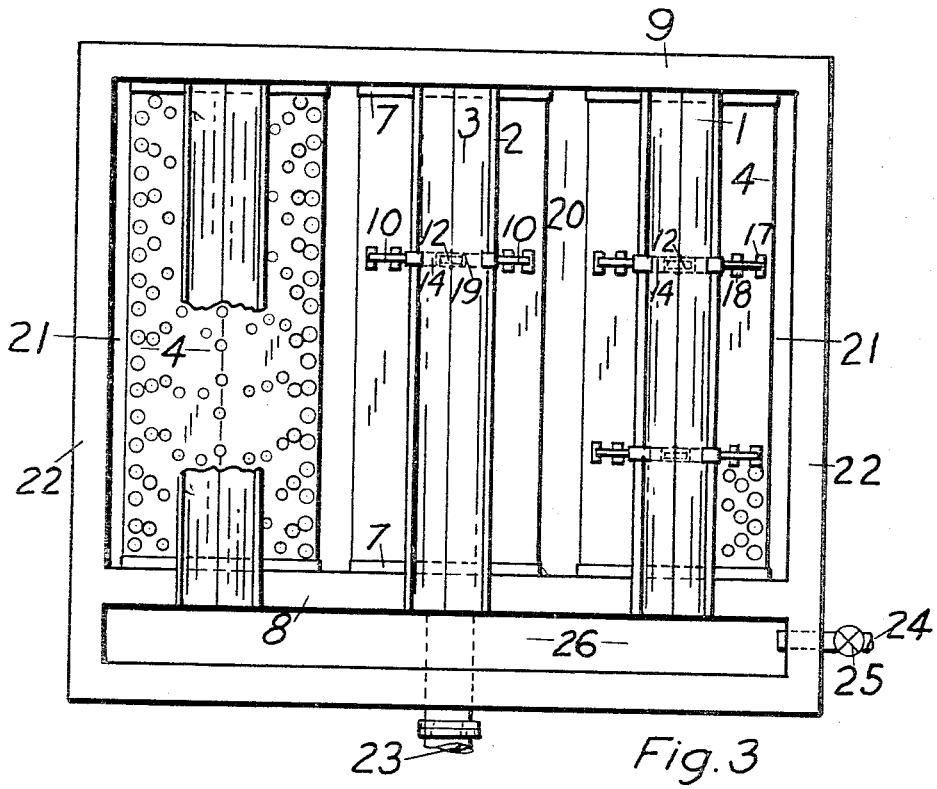
Figure 4:
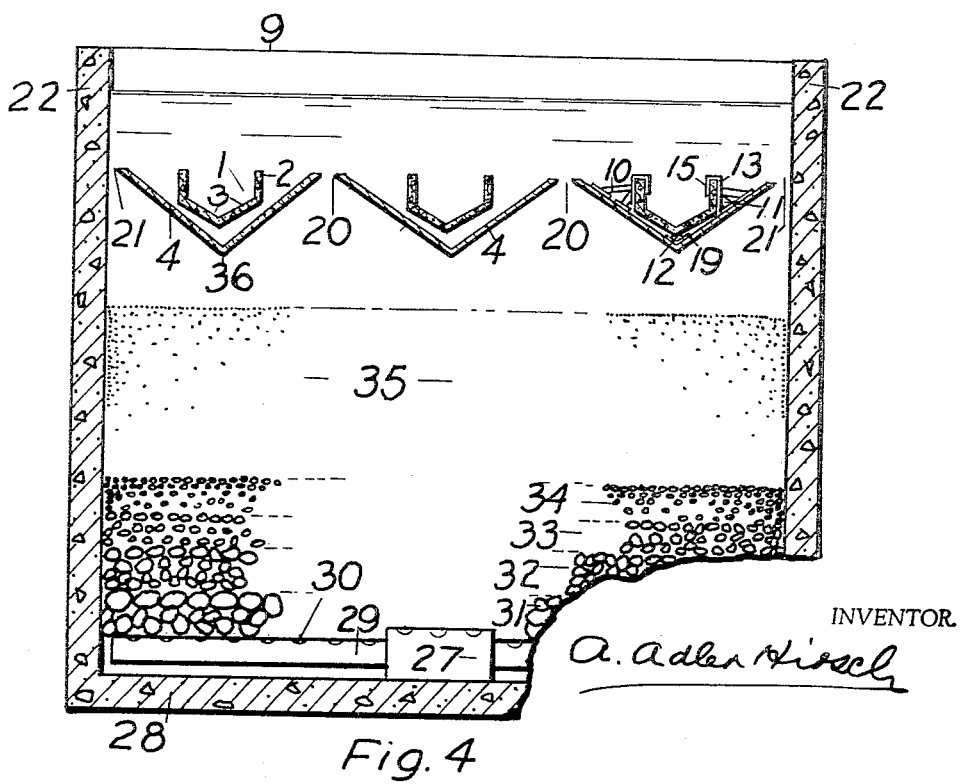

FIGURE 1 is a cross-section of a wash water trough in a rapid sand filter with the perforated baffle boards in place supported in part thereon, FIGURE 2 is a plan view of the above, FIGURE 3 is a plan view of a filter box with the perforated wash water flow equalization baffles installed therein, to show their relation to the wash troughs, and FIGURE 4 is a cross section of the above transverse to the wash water troughs to show the relation of the flow equalization baffles to the various filter components.

Figure 5:
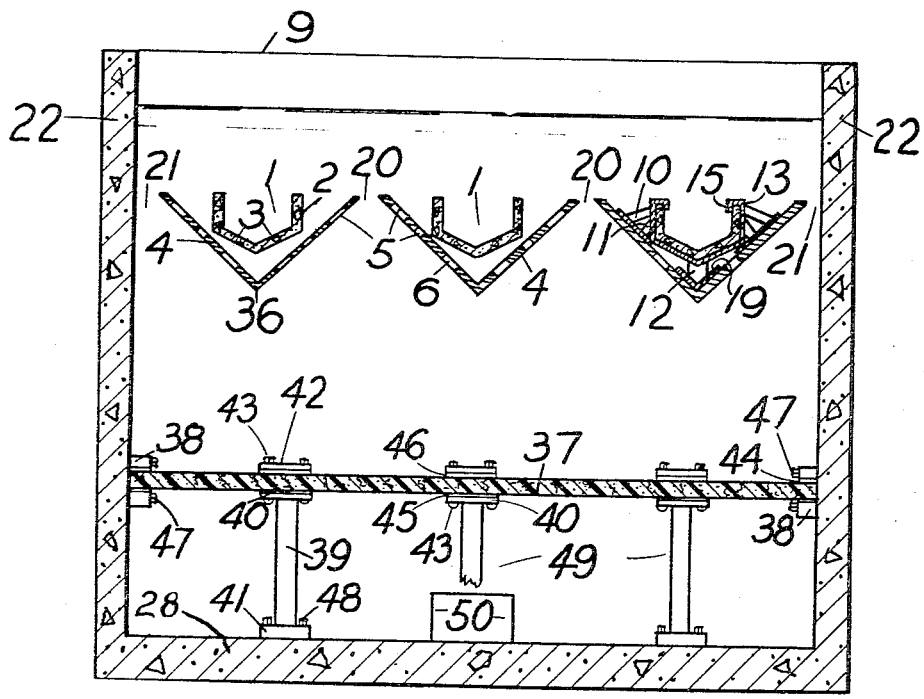

FIGURE 5 is a transverse vertical cross section of a filter box provided with V-shaped equalization baffles, as in FIGURE 4, but having as the filter element a pervious membrane.

The same identifying numeration is retained throughout the drawings for a given element. Referring to the various drawings:

In FIGURE 1, 1 is a wash water trough here, for example, of rectangular section with vertical sides 2 and V-shaped bottom 3. Flow equalization baffles 4 are disposed concavely in open V-pattern under the bottom and outboard of the sides of wash water trough 1 as shown. An array of holes 5 in baffle 4 are graduated in size and spacing so that more opening for flow of wash water toward the troughs to overflow therein is presented as distance out from the side of the trough increases. In similar manner holes vertically underneath the trough bottom, particularly the apical holes 6, are larger and more numerous than those under the side wall 2 of the trough. This equalizes flow per unit superficial sand area in either direction laterally from the trough sides 2.

The flow equalization baffle is supported primarily by means of cleats 7 affixed to the front and the back walls 8 and 9, respectively, of the filter box. The baffle is inserted slidably in the space between the cleats. Holes 5 also serve as handles. Further support and rigidity is provided by stiffening brackets 10, 11 and 12, which are fastened at points along the span or run of the filter trough to the baffle. These stiffeners are welded to bases 13 and 14 on the sides and bottom of the trough, respectively. Base 13 overhangs the lip of the trough and is screwed to the inside through overhang 15. A clip 16 joins bases 13 and 14 in order to support the bottom stiffener 12. On the baffle end, the stiffeners are welded to bearing plates 17, 18 and 19, which are bolted to the baffles.

FIGURE 2 shows the longitudinal disposition of the baffles parallel to the troughs throughout their span between the front and back walls.

FIGURE 3 shows in plan the relation of the V-inclined perforated guidance baffles 4 to the rest of the filter box. Baffles are placed underneath each trough. Baffles between adjacent troughs do not touch but leave an open space 20 for ascending wash water to pass through without impediment. Here a minimum of resistance to flow is desired as the water from this portion of the filter must travel the longest distance to a lip of a trough. Similar spaces 21, but only half the width of the preceding, are allowed between the extreme baffles and the side walls 22.

As is customary in filter construction effluent leaves and back wash water enters the filter box through a pipe 23. A drain line 24 with drain valve 25 indicated connects into the forebay 26.

In FIGURE 4 the relation of the baffles to the filter structure is shown in section. The backwash line 23 enters manifold 27 and, in this particular example selected for illustration, is distributed across the bottom 28 of the filter through laterals 29. The object of this understructure is to attain uniform distribution areally of the wash water underneath the gravel courses.

Wash water is discharged from the laterals through jets 30 and rises through several layers of graded gravel 31, 32, 33, 34 and finally through the sand bed 35, expanding same, and carrying off the deposited silt and floc. The sand bed is expanded to a point just under the apex 36 of the abutting perforated baffles or guide board 4. The washings pass through the perforations 5 and 6, and the side and medial openings 20 and 21, and then flow over the lip of the trough 1. The trough discharges to the forebay and thence through the filter drain to disposal.

The distribution of upflow wash water is kept uniform throughout its passage across the gravel and the expanded sand by the selective guidance exerted by the specially arranged and perforated V-baffles 4. This structure selects flow in the supernatant washings in relation to the distance of the upflowing filaments from the lateral position of the lip of the trough. Stream lines in advance of the baffle are thus all vertical and equidistant in the supernatant zone. In this way poorly washed areas are avoided, thereby resulting in better and safer filter performance and decreased depreciation within the bed.

*Tests.*—Tests for proper placement or corrective plugging of the orifices in the V-baffle are made according to either of the following methods:

(1) Samples of upflow are caught throughout a wash from variously disposed ports in the V-baffles. Turbidities should be fairly alike and clearing should take place at approximately the same times.

(2) The bed is washed at a given rate of upflow, sufficient to expand the whole bed, until fairly clear. The wash rate is then increased. No appreciable rise in turbidity in the washings should result.

Without proper baffling each increment in upflow rate will scour off considerable additional deposit from the sand grains to show in the washings. Where insufficient clearing action is observed more baffle openings are allowed. Plugs are inserted or covers set over those orifices which clear up the earliest.

These tests and correctives are repeated until the time required for clearing of the backwash is substantially the same over the whole filter bed.

*Relation to production phase.*—Being amply perforated, also with sloping sides and apical holes acting as a bottom drain, these V-shaped baffles do not interfere with normal filtration action.

In FIGURE 5, showing V-shaped flow equalization baffles 4 under wash troughs 1, the filter medium is a permeable septum, such as a pervious membrane 37. This membrane is supported at the filter walls 22 by cleats 38 and over its span by supporting columns 39. To spread the area of contact at the top of the columns are caps 40, and at the bottom are bases 41. Cover plates 42 and bolts 43 hold the membrane to the column caps. This retention is especially necessary to resist the upthrust during a backwash. Pressure at the area of contact between the cleats 38 and the membrane 37, and between the caps 40 and cover plates 42 and membrane is softened by cleat gaskets 44, cap gaskets 45 and cover plate gaskets 46. Cleats 38 are fastened to filter wall 22 by means of lag bolts 47. Lag bolts 48 secure the column bases to floor 28. This method for supporting the membrane prevents movement particularly resisting the upward thrust during backwashing.

In the flow equalization baffle 2, holes 5 and 6 vary in size and number from row to row, the larger areas of opening being at the greater distances from a point on the baffle directly underneath the side walls of the trough. These holes are so sized, spaced, and later some of them plugged during field tests, as to distribute upward currents uniformly through the membrane during backwash. Backwash water enters the plenum space 49, underneath membrane 37, through wash water inlet opening 50.

During the backwash operation, wash water entering at the floor of the filter, through opening 50 spreads through the plenum space 49, passes upward through the membrane 37, thence upward through the orifices 5 and 6 in the upflow equalization baffles 4 and through edge spaces 20 and 21, finally overflowing the wash water troughs and out to waste. The membrane, if necessary, may be further supported on one or both sides by a pervious plate or the like to render the filtering assembly more rigid during the above described operations.

I claim:

1. In an apparatus through which a liquid stream passes, a porous element therein, distributive means upstream from said porous element to distribute substantially equally the liquid stream to said porous element, a system of collection means downstream from said porous element having an entry to draw off effluent, means for mounting said collection means, and a set of flow-equalizing baffles interposed in advance of said collection means, said baffles paralleling said collection means and disposed convex to the direction of flow, said baffles in elevation being completely below the plane of said collection means, a plurality of perforations in said baffles of varying sizes and spacings to provide a continuous variation in resistance to said flow, said resistance being a minimum at the greatest distance from the entry to said collection means and a maximum at the smallest distance therefrom.

2. The apparatus of claim 1 in which the porous element consists of a membrane pervious to the liquid stream being passed.

3. The apparatus of claim 1 in which the porous element consists of layers of particulate material.

4. In a filter apparatus cleaned by backwash in reverse flow, a granular bed having a plurality of layers, container means for said bed including a plurality of side walls, a plurality of wash water troughs above said bed, each trough having overflow lips, a distributive means to apply wash water uniformly underneath said granular bed and expand the top layer thereof, means to furnish said wash water to said distributive means, and upflow equalizing means above said bed to maintain uniform upflow in the wash water emerging from said expanded top layer over its surficial area.

5. The apparatus of claim 4 in which the upflow equalizing means comprises a plurality of baffles, one of said baffles extending the length of each of said troughs and parallel thereto, said baffles being of substantially V-shape with the vertex under the center line of each of said wash trough, said baffles having a plurality of perforations, the size and number of said perforations being approximately proportional to their lateral distance in either direction from the overflow lips of said troughs, the baffles of adjacent troughs defining a space therebetween parallel to said troughs, and extreme troughs and the side walls of said filter parallel to said extreme troughs also defining a space therebetween, said perforations and spacings guiding upflow of said wash water to maintain equal vertical velocity over the entire surface area of said granular bed, and a means to support said V-shaped perforated baffles in rigid relation to said wash water troughs.

6. The apparatus of claim 5 including means to selectively prevent flow through at least some of said perforations in said V-shaped baffles to adjust the overall upflow over the bed to attain upflow uniformity.

7. The apparatus of claim 5 including cleat means fastened on at least two of said walls of said filter to slidably support said baffles therebetween, and said baffles including bracket means extending from the sides and bottoms of said wash water troughs to further stiffen said baffles.

8. In an apparatus through which a liquid stream passes, a porous element therein, distributive means upstream from said porous element to distributive substantially equally the liquid stream to said porous element, a system of collection means downstream from said porous element to draw off effluent, a set of flow equalizing baffles, means for mounting said collection means with said set of flow-equalizing baffles interposed in advance of said collection means, said baffles in elevation being intermediate said collection means and said porous element, a plurality of openings in said baffles of varying sizes and spacings to provide a resistance to said flow, said resistance being a minimum at a distance furthermost from said collection means and a maximum at a distance closest to said collection means with intermediate values of resistance to said flow at points on said flow equalizing baffles intermediate said furthermost distance and said closest distance to attain uniformity of flow through said porous element.

9. The apparatus of claim 8 in which the porous element consists of a membrane pervious to the liquid stream being passed.

10. The apparatus of claim 8 in which the porous element consists of at least one layer of particulate material.

References Cited by the Examiner

UNITED STATES PATENTS

| | | | |
|---|---|---|---|
| 654,479 | 7/1900 | McNally | 210—279 X |
| 1,406,340 | 2/1922 | Brown | 210—275 X |
| 2,888,140 | 5/1959 | Hebert | 210—275 |

REUBEN FRIEDMAN, *Primary Examiner.*

D. M. RIESS, *Assistant Examiner.*